(12) United States Patent
Curry

(10) Patent No.: US 10,604,074 B1
(45) Date of Patent: Mar. 31, 2020

(54) ADJUSTABLE SIDE VIEW MIRROR APPARATUS

(71) Applicant: Emmett Curry, Panama City, FL (US)

(72) Inventor: Emmett Curry, Panama City, FL (US)

( * ) Notice: Subject to any disclaimer, the term of this patent is extended or adjusted under 35 U.S.C. 154(b) by 0 days.

(21) Appl. No.: 15/274,490

(22) Filed: Sep. 23, 2016

(51) Int. Cl.
*B60R 1/072* (2006.01)
*G02B 5/10* (2006.01)
*G02B 7/182* (2006.01)

(52) U.S. Cl.
CPC .............. *B60R 1/072* (2013.01); *G02B 5/10* (2013.01); *G02B 7/182* (2013.01)

(58) Field of Classification Search
CPC ........... B01R 1/00; B01R 1/002; B01R 1/007; B01R 1/08; B01R 1/02; B01R 1/025; B01R 1/06; B01R 1/062; B01R 1/064; B01R 1/066; B01R 1/068; B01R 1/07; B01R 1/072; B01R 1/081
USPC ........ 359/841–844, 846, 850, 854, 871, 872
See application file for complete search history.

(56) References Cited

U.S. PATENT DOCUMENTS

| | | | | |
|---|---|---|---|---|
| 3,712,715 A | * | 1/1973 | Wagner | B60R 1/0605 359/507 |
| 3,826,563 A | * | 7/1974 | Davis | B60R 1/081 359/850 |
| 5,500,766 A | * | 3/1996 | Stonecypher | B60R 1/081 359/605 |
| 5,805,366 A | * | 9/1998 | McFarland | B60R 1/1207 340/475 |
| 7,934,843 B2 | * | 5/2011 | Lynam | B60R 1/08 359/866 |

\* cited by examiner

*Primary Examiner* — Robert E. Tallman

(57) ABSTRACT

An adjustable side view mirror apparatus including a casing having a front edge and a pair of mirrors disposed within the front edge. The pair of mirrors includes a flattened upper mirror and a convexly curved lower mirror. An attachment arm is attached to each of the casing and an exterior surface of a vehicle. Each of an upper servo motor and a lower servo motor of a pair of servo motors is disposed within the casing and rotatably attached to each of the upper mirror and the lower mirror, respectively. Each of an upper mirror control and a lower mirror control of a base unit is in operational communication with the upper servo motor and the lower servo motor, respectively, and configured to activate each of the upper servo motor and the lower servo motor, respectively, to adjust each of the upper mirror and the lower mirror, respectively.

1 Claim, 4 Drawing Sheets

ADJUSTABLE SIDE VIEW MIRROR APPARATUS

BACKGROUND OF THE INVENTION

Various types of side view mirrors are known in the prior art. However, what has been needed is an adjustable side view mirror apparatus including a casing having a front edge and a pair of mirrors disposed within the front edge, with the pair of mirrors including a flattened upper mirror and a convexly curved lower mirror. An attachment arm is attached to each of the casing and an exterior surface of a vehicle. What has been further needed is for each of an upper servo motor and a lower servo motor of a pair of servo motors to be disposed within the casing and rotatably attached to each of the flattened upper mirror and the convexly curved lower mirror, respectively. Lastly, what has been needed is for each of an upper mirror control and a lower mirror control of a base unit to be in operational communication with the upper servo motor and the lower servo motor, respectively, such that the upper mirror control and the lower mirror control is configured to activate each of the upper servo motor and the lower servo motor, respectively, to adjust each of the flattened upper mirror and the convexly curved lower mirror, respectively. The adjustable side view mirror apparatus thus helps to prevent blind spots in a driver's field of vision through the unique structure of each of the flattened upper mirror and the convexly curved lower mirror, which in combination effectively cover the line of sight that normally falls into the blind spots of the driver.

FIELD OF THE INVENTION

The present invention relates to side view mirrors, and more particularly, to an adjustable side view mirror apparatus.

SUMMARY OF THE INVENTION

The general purpose of the present adjustable side view mirror apparatus, described subsequently in greater detail, is to provide an adjustable side view mirror apparatus which has many novel features that result in an adjustable side view mirror apparatus which is not anticipated, rendered obvious, suggested, or even implied by prior art, either alone or in combination thereof.

To accomplish this, the present adjustable side view mirror apparatus includes a dome-shaped casing having a continuous front edge and a pair of elongated substantially rectangular mirrors disposed within the front edge. The pair of mirrors includes a flattened upper mirror and a convexly curved lower mirror. An inner plate is disposed within the dome-shaped casing behind the pair of mirrors. The inner plate is continuously disposed from a top portion of the dome-shaped casing to a bottom portion of the dome-shaped casing. An attachment arm has a proximal end attached to the dome-shaped casing and a distal end attached to one of a right side of an exterior surface of a vehicle and a left side of the exterior surface of the vehicle.

The adjustable side view mirror apparatus further includes a pair of servo motors. The pair of servo motors includes an upper servo motor and a lower servo motor. Each of the upper servo motor and the lower servo motor is disposed on a front surface of the inner plate and rotatably attached to each of the flattened upper mirror and the convexly curved lower mirror, respectively. A base unit disposed on an interior surface of a driver's side door of the vehicle has a pair of controls including an upper mirror control and a lower mirror control. The upper mirror control is in operational communication with the upper servo motor, and the lower mirror control is in operational communication with the lower servo motor. Each of the upper mirror control and the lower mirror control is configured to activate each of the upper servo motor and the lower servo motor, respectively, to rotatably adjust each of the flattened upper mirror and the convexly curved lower mirror, respectively, within the front edge of the dome-shaped casing. The adjustable side view mirror apparatus thus eliminates a driver's blind spots as a result of each of the flattened upper mirror and the convexly curved lower mirror, which in combination entirely cover the line of sight that normal falls into the driver's blind spots.

Thus has been broadly outlined the more important features of the present adjustable side view mirror apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
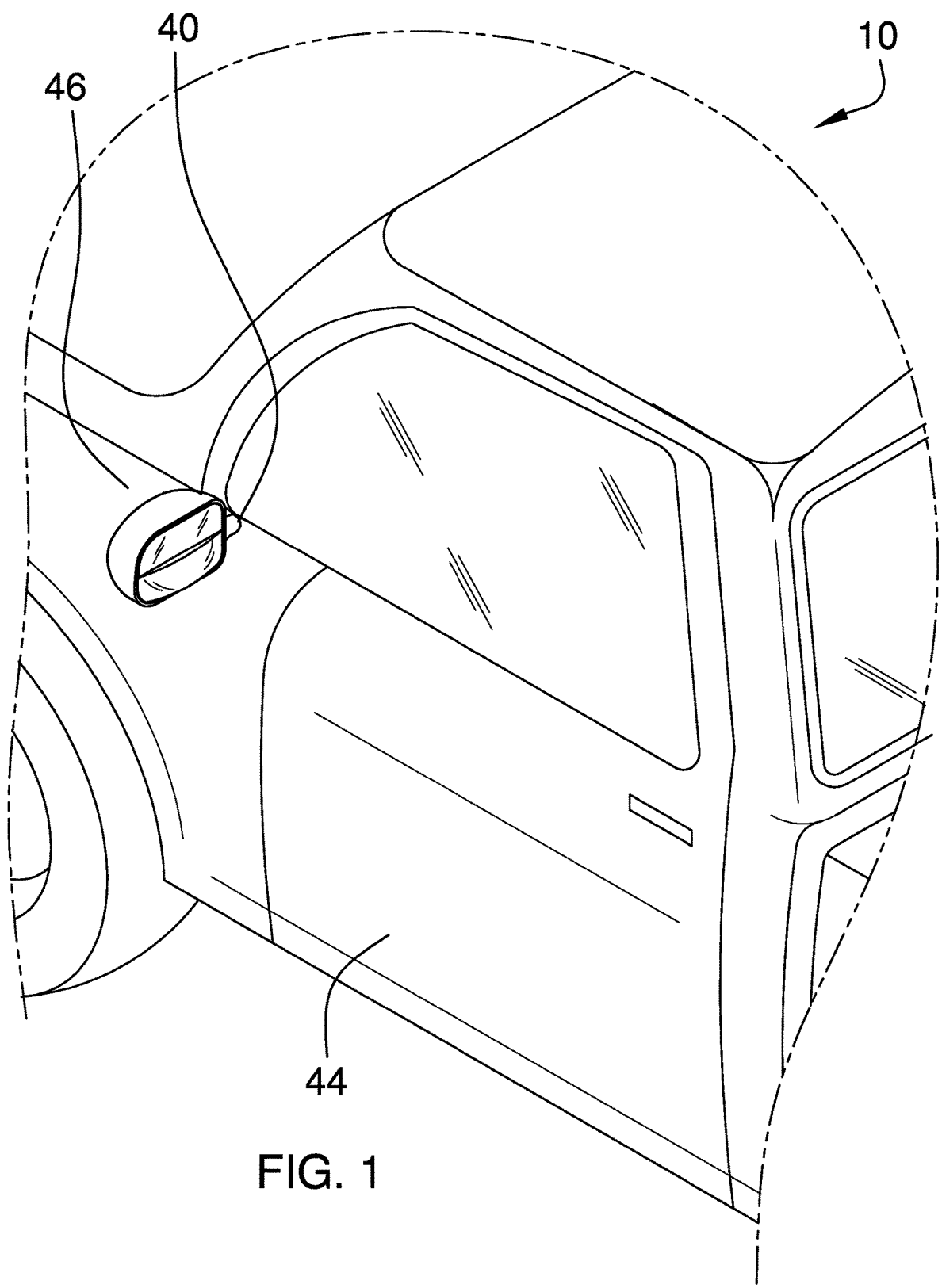
FIG. 1 is an in use view showing a flattened upper mirror and a convexly curved lower mirror.
Figure 2:
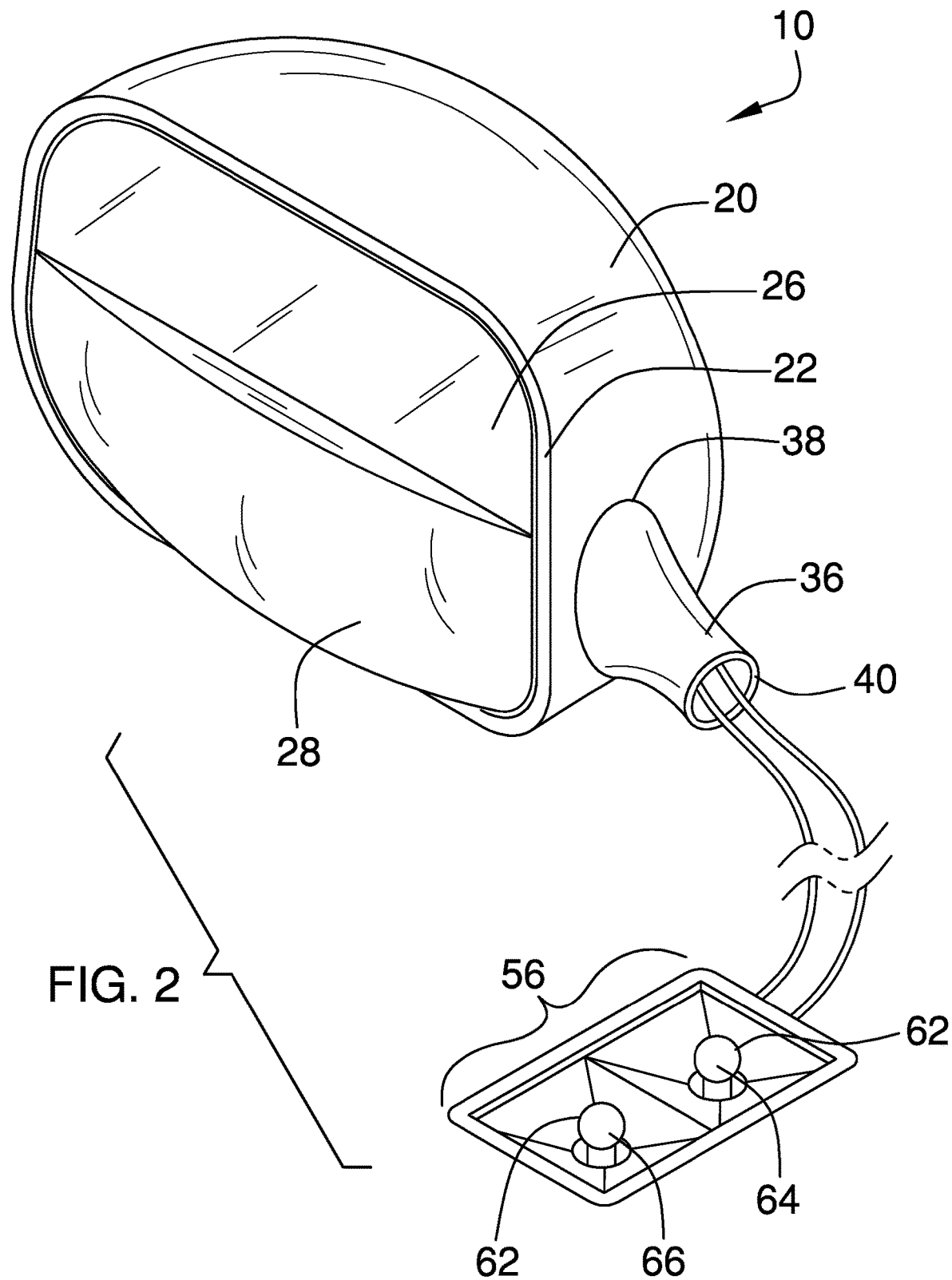
FIG. 2 is a front isometric view.
Figure 3:
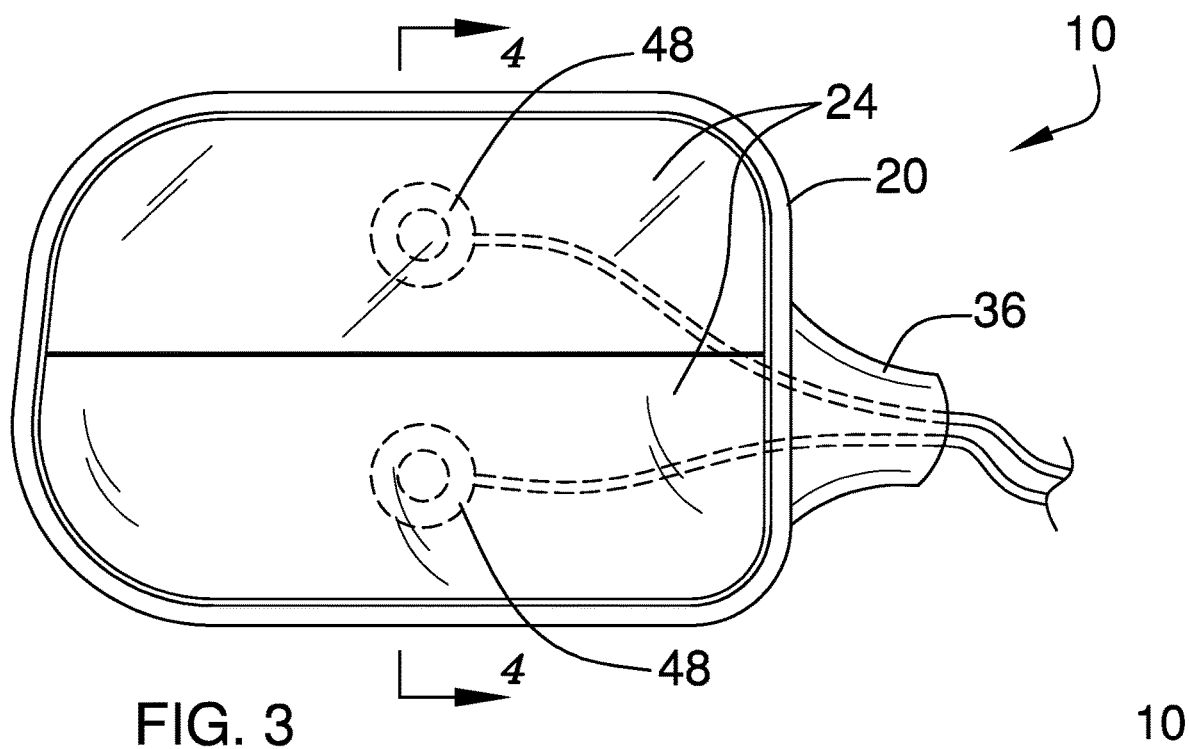
FIG. 3 is a front elevation view.
Figure 4:
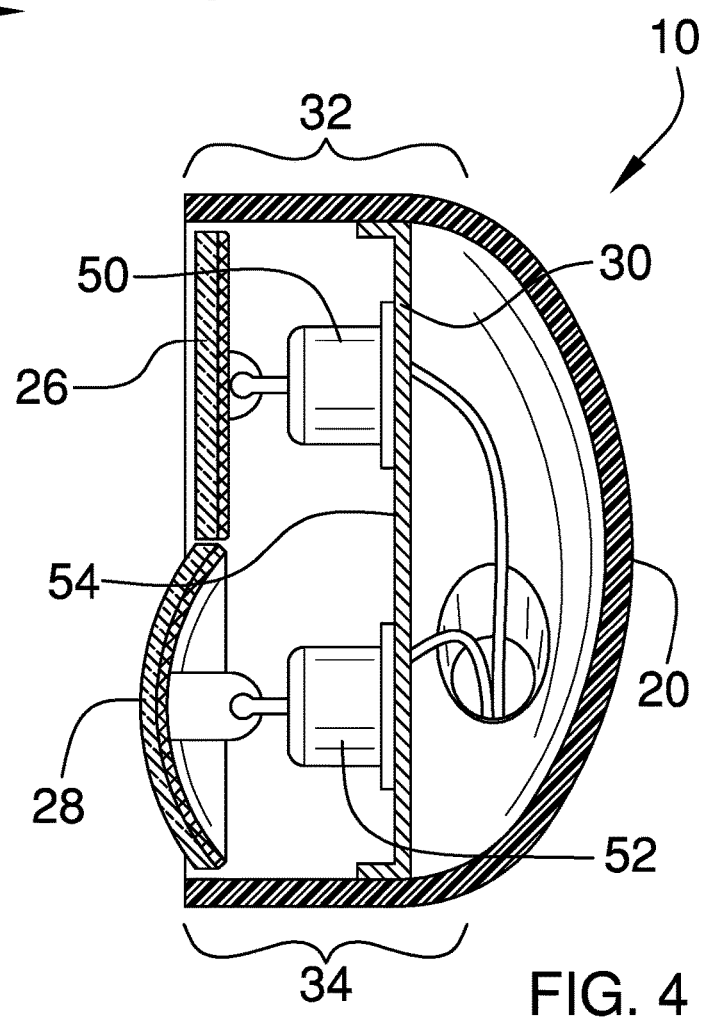
FIG. 4 is a cross-sectional view taken along line 404 of FIG. 3.
Figure 5:
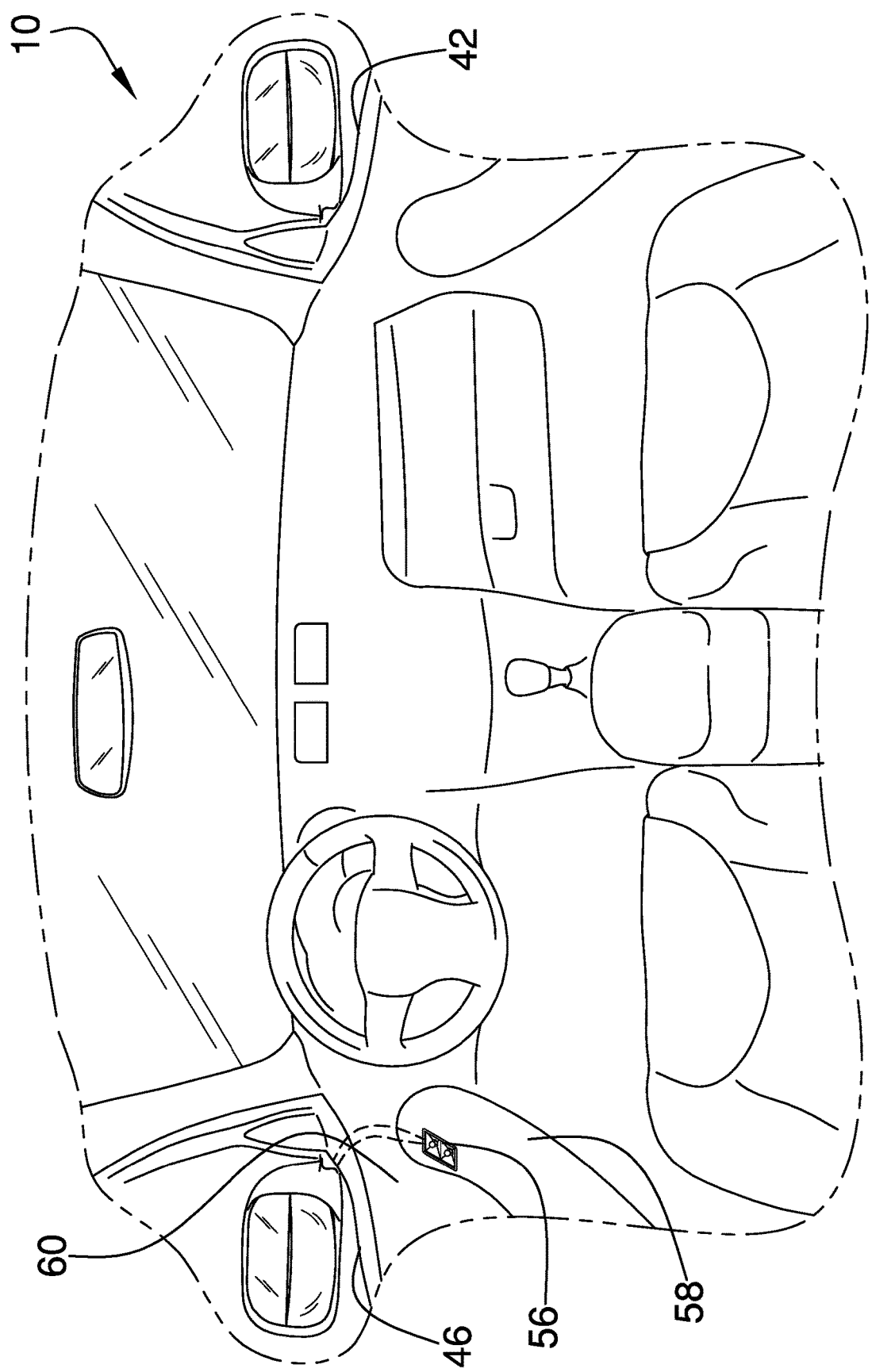
FIG. 5 is an in use view showing a base unit.

With reference now to the drawings, and in particular FIGS. 1 through 5 thereof, an example of the instant adjustable side view mirror apparatus employing the principles and concepts of the present adjustable side view mirror apparatus and generally designated by the reference number 10 will be described.

Referring to FIGS. 1 through 5 the present adjustable side view mirror apparatus 10 is illustrated. The adjustable side view mirror apparatus 10 includes a dome-shaped casing 20 having a continuous front edge 22 and a pair of elongated substantially rectangular mirrors 24 disposed within the front edge 22. The pair of mirrors 24 includes a flattened upper mirror 26 and a convexly curved lower mirror 28. An inner plate 30 is disposed within the dome-shaped casing 20 behind the pair of mirrors 24. The inner plate 30 is continuously disposed from a top portion 32 of the dome-shaped casing 20 to a bottom portion 34 of the dome-shaped casing 20. An attachment arm 36 has a proximal end 38 attached to the dome-shaped casing 20 and a distal end 40 attached to one of a right side 42 of an exterior surface of a vehicle 44 and a left side 46 of the exterior surface of the vehicle 44.

The adjustable side view mirror apparatus 10 further includes a pair of servo motors 48. The pair of servo motors 48 includes an upper servo motor 50 and a lower servo motor 52. Each of the upper servo motor 50 and the lower servo motor 52 is disposed on a front surface 54 of the inner plate 30 and rotatably attached to each of the flattened upper mirror 26 and the convexly curved lower mirror 28, respectively. A base unit 56 disposed on an interior surface 58 of a driver's side door of the vehicle 60 has a pair of controls 62 including an upper mirror control 64 and a lower mirror control 66. The upper mirror control 64 is in operational communication with the upper servo motor 50, and the lower mirror control 66 is in operational communication with the lower servo motor 52. Each of the upper mirror control 64 and the lower mirror control 66 is configured to activate each of the upper servo motor 50 and the lower servo motor 52, respectively, to rotatably adjust each of the flattened upper mirror 26 and the convexly curved lower mirror 28, respectively, within the front edge 22 of the dome-shaped casing 20.

What is claimed is:

1. An adjustable side view mirror apparatus comprising:
a dome-shaped casing having a continuous front edge and a pair of elongated substantially rectangular mirrors, each elongated mirror of the pair of elongated mirrors being disposed within the front edge such that the mirrors are elongated horizontally across the casing, the pair of mirrors comprising a flattened upper mirror and a convexly curved lower mirror, the lower mirror being convexly curved between opposed lateral edges and straight extending perpendicularly between top and bottom edges of the lower mirror, the top edge of the lower mirror being horizontally aligned with a lower edge of the top mirror;

an inner plate disposed within the dome-shaped casing behind the pair of mirrors, the inner plate continuously disposed from a top portion of the dome-shaped casing to a bottom portion of the dome-shaped casing;

an attachment arm having a proximal end attached to the dome-shaped casing and a distal end attached to one of a right side of an exterior surface of a vehicle and a left side of the exterior surface of the vehicle;

a pair of servo motors comprising an upper servo motor and a lower servo motor, each of the upper servo motor and the lower servo motor disposed on a front surface of the inner plate and rotatably attached to each of the flattened upper mirror and the convexly curved lower mirror, respectively; and a base unit having a pair of controls comprising an upper mirror control and a lower mirror control, the base unit disposed on an interior surface of a driver's side door of the vehicle;

wherein the upper mirror control is in operational communication with the upper servo motor, and the lower mirror control is in operational communication with the lower servo motor;

wherein each of the upper mirror control and the lower mirror control is configured to activate each of the upper servo motor and the lower servo motor, respectively, to rotatably adjust each of the flattened upper mirror and the convexly curved lower mirror, respectively, within the front edge of the dome-shaped casing.

* * * * *